(12) United States Patent
Meeranpillai (10) Patent No.: US 12,049,594 B2
(45) Date of Patent: Jul. 30, 2024

(54) NATURAL MATERIAL FOR SEPARATING OIL-IN-WATER EMULSIONS

(71) Applicant: Saudi Arabian Oil Company, Dhahran (SA)

(72) Inventor: Nagoorpitchai S. Meeranpillai, Al Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/682,299

(22) Filed: Feb. 28, 2022

(65) Prior Publication Data

US 2023/0295521 A1    Sep. 21, 2023

(51) Int. Cl.
*C10G 33/06* (2006.01)
*B01D 17/02* (2006.01)
*B01D 17/04* (2006.01)

(52) U.S. Cl.
CPC ......... *C10G 33/06* (2013.01); *B01D 17/0214* (2013.01); *B01D 17/045* (2013.01)

(58) Field of Classification Search
CPC .............. C10G 33/06; B01D 17/0214; B01D 17/045
See application file for complete search history.

(56) References Cited

U.S. PATENT DOCUMENTS

| | | |
|---|---|---|
| 1,405,119 A | 1/1922 | Harris |
| 1,612,557 A | 12/1926 | Weisgerber |
| 2,547,190 A | 4/1951 | Wilson |
| 2,601,904 A | 7/1952 | Erwin |
| 2,730,240 A | 1/1956 | Johnson |
| 3,090,759 A | 5/1963 | Jenkins |
| 3,098,827 A | 7/1963 | Kirkpatrick |
| 3,318,448 A | 5/1967 | Fryer |
| 3,488,294 A | 1/1970 | Annand |
| 3,558,482 A * | 1/1971 | De Young .............. B01D 17/08 210/708 |
| 3,574,329 A | 4/1971 | Beavon |
| 3,700,335 A | 10/1972 | Seelbinder |
| 3,797,666 A * | 3/1974 | Nakanishi ............ B01D 17/045 210/DIG. 5 |
| 3,853,753 A * | 12/1974 | Jones ................. B01D 17/0202 210/708 |
| 3,867,285 A * | 2/1975 | Keller, Jr. .......... B01D 17/0202 210/671 |
| 3,992,291 A | 11/1976 | Hirs |
| 4,226,689 A | 10/1980 | Mayse |
| 4,252,631 A | 2/1981 | Hovarongkura et al. |
| 4,415,426 A | 11/1983 | Hsu et al. |
| 4,419,200 A | 12/1983 | Hsu et al. |
| 4,581,112 A | 4/1986 | Mintz et al. |
| 4,582,629 A | 4/1986 | Wolf |
| 4,592,849 A * | 6/1986 | McMillen .............. C10G 33/06 210/DIG. 5 |
| 4,830,755 A | 5/1989 | Hardin |
| 4,876,879 A | 10/1989 | Ruesch |
| 4,996,490 A | 2/1991 | Scott et al. |
| 5,147,562 A | 9/1992 | Heyman |
| 5,381,002 A | 1/1995 | Morrow et al. |
| 5,705,055 A | 1/1998 | Holloway et al. |
| 5,738,762 A | 4/1998 | Ohsol |
| 5,885,424 A | 3/1999 | Davis et al. |
| 5,951,456 A | 9/1999 | Scott |
| 6,055,859 A | 5/2000 | Kozuka et al. |
| 6,077,400 A | 6/2000 | Kartchner |
| 6,117,682 A | 9/2000 | Lynn et al. |
| 6,860,979 B2 | 3/2005 | Sams |
| 6,955,753 B1 | 10/2005 | Gomez |
| 7,468,402 B2 | 12/2008 | Yang et al. |
| 7,771,588 B2 | 8/2010 | Engel et al. |
| 8,043,388 B2 | 10/2011 | Waters et al. |
| 8,828,237 B2 | 9/2014 | Lange |
| 9,249,650 B2 | 2/2016 | Bruce et al. |
| 9,285,080 B2 | 3/2016 | Fan et al. |
| 9,297,747 B2 | 3/2016 | Han et al. |
| 10,260,010 B2 * | 4/2019 | Soliman ................ B01D 17/06 |
| 10,350,515 B2 | 7/2019 | Al-Shafei et al. |
| 10,954,455 B1 | 3/2021 | Eggert et al. |
| 11,117,103 B2 | 9/2021 | Livazovic et al. |
| 2002/0015585 A1 | 2/2002 | Jensen |
| 2006/0237372 A1 | 10/2006 | Arciszewski et al. |
| 2008/0221226 A1 | 9/2008 | Coutinho et al. |
| 2009/0107558 A1 | 4/2009 | Quigley |

(Continued)

FOREIGN PATENT DOCUMENTS

| | | |
|---|---|---|
| CA | 2231565 | 1/1997 |
| CN | 2296230 | 11/1998 |

(Continued)

OTHER PUBLICATIONS

Liu et. al. 2018. Preparation of superhydrophobic-oleophilic quartz sand filter and its application in oil-water separation. Applied Surface Science 447 (2018) 656-663. (Year: 2018).*
*NETAFIM Mesh* vs. *Micron Comparison Chart*. (Year: None).*
Schaschke, Carl. (2014). Dictionary of Chemical Engineering "Throughput" (pp. 379). Oxford University Press. Retrieved from https://app.knovel.com/hotlink/pdf/id:ktOOTW4T_R9/dictionary-chemical-engineering/ (Year: 2014).*
U.S. Appl. No. 17/550,863, Meeranpillai et al.
U.S. Appl. No. 17/679,582, Meeranpillai et al.
U.S. Appl. No. 17/681,406, Meeranpillai.
U.S. Appl. No. 17/681,576, Meeranpillai et al.
U.S. Appl. No. 17/682,243, Alharthy et al.
Abanaki.com [online], "How do I remove oil from water?", 2022, retrieved on Feb. 4, 2022, retrieved from URL <https://www.abanaki.com/articles/how-do-i-remove-oil-from-water/>, 4 pages.
Abdulredha et al., "Overview on petroleum emulsions, formation, influence and demulsification treatment techniques," Arabian Journal of Chemistry, 2018, 43 pages.

(Continued)

*Primary Examiner* — Liam Royce
(74) *Attorney, Agent, or Firm* — Fish & Richardson P.C.

(57) ABSTRACT

A method and a system for separating an oil-in-water emulsion in a water-oil separation plant (WOSP) are provided. An exemplary method includes feeding the oil-in-water emulsion to the WOSP, and forcing the oil-in-water emulsion through a silica sand filter to separate the oil and form a separated water stream.

8 Claims, 9 Drawing Sheets

(56) References Cited

U.S. PATENT DOCUMENTS

| | | | |
|---|---|---|---|
| 2010/0231904 | A1 | 9/2010 | Tyrie et al. |
| 2012/0152517 | A1 | 6/2012 | Wallace et al. |
| 2014/0260561 | A1 | 9/2014 | Brost et al. |
| 2016/0082365 | A1 | 3/2016 | Miralles et al. |
| 2017/0174530 | A1* | 6/2017 | Yin .............. B01D 17/0217 |
| 2017/0254564 | A1 | 9/2017 | Everly et al. |
| 2018/0119031 | A1 | 5/2018 | Haworth et al. |
| 2019/0153304 | A1 | 5/2019 | Zelenev |
| 2019/0187034 | A1 | 6/2019 | Lee et al. |
| 2020/0255748 | A1 | 8/2020 | Soliman et al. |
| 2021/0207040 | A1 | 7/2021 | Amminudin et al. |

FOREIGN PATENT DOCUMENTS

| | | | |
|---|---|---|---|
| CN | 2502767 | | 7/2002 |
| CN | 2539559 | | 3/2003 |
| CN | 2669953 | | 1/2005 |
| CN | 1589947 | | 3/2005 |
| CN | 1648058 | | 8/2005 |
| CN | 2721201 | | 8/2005 |
| CN | 1672761 | | 9/2005 |
| CN | 2765652 | | 3/2006 |
| CN | 1295007 | | 1/2007 |
| CN | 1298814 | | 2/2007 |
| CN | 101037612 | | 9/2007 |
| CN | 201181904 | | 1/2009 |
| CN | 100506941 | | 7/2009 |
| CN | 101550353 | | 10/2009 |
| CN | 101845105 | | 9/2010 |
| CN | 101161789 | | 11/2010 |
| CN | 102091439 | | 6/2011 |
| CN | 104684624 | | 6/2015 |
| CN | 112723458 | | 4/2021 |
| CN | 112723458 | A * | 4/2021 ............. B01D 17/02 |
| EP | 0062527 | | 10/1982 |
| EP | 0072628 | | 2/1983 |
| EP | 0544158 | | 6/1993 |
| EP | 1254669 | | 11/2002 |
| JP | 2005169186 | | 6/2005 |
| WO | WO 1994000757 | | 1/1994 |
| WO | WO 2005030360 | | 4/2005 |
| WO | WO 2009067362 | | 5/2009 |
| WO | WO 2010134822 | | 11/2010 |
| WO | WO 2011121319 | | 10/2011 |

OTHER PUBLICATIONS aesarabia.com [online], "Oil removal systems," 2022, retrieved on Feb. 4, 2022, retrieved from URL <https://www.aesarabia.com/oil-removal-systems/>, 7 pages.

Almojjly et al., "Removal of oil from oil-water emulsion by hybrid coagulation/sand filter as pre-treatment," Journal of Water Process Engineering, 2018, 26:17-27, 11 pages.

Banda-Cruz et al., "Crude oil UV spectroscopy and light scattering characterization, " Petroleum Science and Technology, Jun. 2016, 34(8):732-738.

Bastow, et al., "Ultraviolet spectroscopy for the analysis of oil-in-water effluent using isopropanol as co-solvent," Applied Spectroscopy, 1997, 51(3):319-322, 5 pages.

Bigui et al., "Filtration of oil from oily wastewater via hydrophobic modified quartz sand filter medium," Journal of Water Reuse and Desalination, Jan. 2018, 8(4):544-552, 9 pages.

Borges et al., "Breaking of Water-in-Crude-Oil Emulsions. 3. Influence of Salinity and Water-Oil Ratio on Demulsifier Action," Energy & Fuels, 2009, 23:1568-1574, 7 pages.

Carvalho et al., "Oil removal from oilfield produced water by sand filter," Brazilian Journal of Petroleum and Gas, 2016, 10(3):161-170, 12 pages.

Chinaflo.com [online], "Oilfield Chemicals/DRA (Drag Reducing Agent) used for crude oil pipeline transportation," 2017, retried Oct. 1, 2021, retrieved from URL <https://www.chinafloc.com/DRA-Drag-reducing-agent-used-for-crude-oil-pipeline-transportation_1553.html>, 4 pages.

Chromalox, "Screw Plug Immersion Heaters Product Data Sheet," PD315-1, Oct. 1998, 6 pages.

Chung et al., "Geometrical Effect of Steam Injection on the Formation of Emulsions in the Steam-Assisted Gravity Drainage Process," The Journal of Canadian Petroleum Technology, Jan. 1988, 8 pages.

Civil-instruments-com.sell.everychina.com [online], "Demulsifer Performance Testing Instrument, Petroleum Testing Instrument," 2021, retrieved Oct. 1, 2021, retrieved from URL <http://civil-instruments-com.sell.everychina.com/p-106461894-demulsifier-performance-testing-instrument-petroleum-testing-instrument.html>, 2 pages.

Dennington et al., "Miniaturized rotating disc rheometer test for rapid screen of draft reducing marine coatings," Surf. Topog.: Metrol. Prop., Sep. 2015, 10 pages.

Dynetesting.com [online], "Force Tensiometers," May 14, 2014, retrieved on Dec. 9, 2021 from URL <https://dynetesting.com/force-tensiometers/force-tensiometers-sigma-700-701/#squelch-taas-tab-content-0-4>, 8 pages.

Goodarzi et al., "A Comprehensive Review on Emulsions and Emulsion Stability in Chemical and Energy Industries," The Canadian Journal of Chemical Engineering, Jan. 2019, 97:281-309, 29 pages.

Higgins, "Environmentally friendly oil in water analysis by FTIR spectroscopy based on ASTM D7678011," Agilent Technologies, 2012, retrieved from URL <https://www.perlan.com.pl/uploaded/AppBundleEntityProductApplication/fileKey/336/5990-9806enappnote630-4500-5500oilwater.pdf>, 6 pages.

Hirasaki et al., "Separation of Produced Emulsions from Surfactant Enhanced Oil Recovery Processes," American Chemical Society, Energy and Fuels, 2010, <http://porousmedia.rice.edu/resources/Emulsion_EOR_Produced.pdf>, 7 pages.

Hong et al., "Rotating disk apparatus for polymer-induced turbulent drag reduction," Journal of Mechanical Science and Technology, 2008, 22:1908-1913, 6 pages.

Karcher et al., "Interfacial energy during the emulsification of water-in-heavy crude oil emulsions," Brazilian Journal of Chemical Engineering, Mar. 2015, 32(1), <http://www.scielo.br/scielo.php?script=sci_arttext&pid=S0104-66322015000100127>, 18 pages.

Kemmer, "Emulsion Breaking," Nalco Water Handbook, Chapter 11, Second Edition, 1988; pp. 11.1-11.18 <http://ssu.ac.ir/cms/fileadmin/user_upload/Daneshkadaha/dbehdasht/markaz_tahghighat_olom_va_fanavarihaye_zist_mohiti/e_book/pasmand/water/58723_11.pdf>, 18 pages.

Kim et al., "A high-precision rotating disk apparatus for drag reduction characterization," Polymer Testing, 2001, 20:43-48, 6 pages.

Kruss-scientific.com [online], "Force Tensiometer—K100," retrieved on Dec. 9, 2021 from URL <https://www.kruss-scientific.com/en-US/products-services/products/k100?gclid=EAIaIQobChMI08y9yqDk9QIViBTUAR3m0Q7xEAAYASAAEgLIFPD_BwE>, 8 pages.

Kruss-scientific.com [online], "Tensiometer," retrieved on Dec. 9, 2021 from URL <https://www.kruss-scientific.com/en-US/know-how/glossary/tensiometer>, 5 pages.

Lawson-Wood et al., "FT-IR quantification of hydrocarbons in environmental water samples based on ASTM D7678," 2015, retrieved from URL <https://labsense.fi/uploads/7/1/9/5/71957143/ft-ir_quantification_of_hydrocarbons_in_environmental_water_samples_based_on_astm_d7678_012499_01_app.pdf>, 4 pages.

Liquidpower.com [online], "About DRA and How it works," 2021, retrieved Oct. 1, 2021, retrieved from URL <https://www.liquidpower.com/what-is-dra/about-dra-and-how-it-works>, 3 pages.

Maiti et al., "Removal of oil from oil-in-water emulsion using a packed bed of commercial resin," Colloids and Surfaces A: Physicochemical and Engineering Aspects, Sep. 2011, 389(1-3):291-298.

Otzisk, digitalrefining.com [online], "Oil/water separation technologies," Kurita Europe, Apr. 2013, <http://www.digitalrefining.com/article/1000798,Oil_water_separation_technologies.html>, 2 pages.

PetroWiki, "Emulsion treating methods," published by SPE International, available on or before Sep. 17, 2013, retrieved from URL <http://petrowiki.org/Emulsion_treating_methods>, 6 pages.

(56) References Cited

OTHER PUBLICATIONS

PetroWiki, "Oil demulsification," published by SPE International, available on or before Dec. 2, 2013, retrieved from URL <http://petrowiki.org/Oil_demulsification#Temperature>, 11 pages.
Schatcogmbh.com [online], "Drag reducing agent (DRA)," retrieved on Feb. 3, 2022 from URL <https://schatcogmbh.com/product/drag-reducing-agent-dra/>, 2 pages.
servereal.com [online], "Demulsifier Performance Testing Equipment," 2017, retrieved on Feb. 3, 2022 from URL<http://servereal.com/demulsifier-performance-testing-equipment/>, 2 pages.
Shu et al., "Separation of SAGD produced emulsions through a combined pre-dewatering and demulsification process," Journal of Petroleum Science and Engineering, 2021, 201:108493, 12 pages.
smartwatermagazine.com [online], "New method for removing oil from water," Feb. 2020, retrieved on Feb. 4, 2022, retrieved from URL <https://smartwatermagazine.com/news/university-bonn/new-method-removing-oil-water>, 5 pages.
Spectrosci.com [online], "Techniques for measuring oil in water," 2016, retrieved on Dec. 17, 2021 from URL <https://www.spectrosci.com/knowledge-center/resource-library/oil-in-water-and-soil>, 5 pages.
Srinivasan et al., "Oil removal from water using biomaterials," Bioresource Technology, Sep. 2010, 101(17):6594-6600, 7 pages.
Suzuki et al., "Removal of emulsified oil from water by coagulation and foam separation," Separation Science and Technology, 2005, 40(16):3407-3418.
White Paper, "Emulsion Breaking Techniques for Oil in Water Solvent Extractions," Spectro Scientific, 2015, 1 page.
Williamson, "Options for removing water in oil," Machinery Lubrication, Jul. 2003, retrieved from URL <https://www.machinerylubrication.com/Read/503/removing-water-in-oil>, 10 pages.
yokogawa.com [online], "Refinery wastewater: Oil & grease removal," 2020, retrieved on Feb. 4, 2022, retrieved from URL <https://www.yokogawa.com/library/resources/application-notes/refinery-wastewater-oil-grease-removal/>, 11 pages.
SAIP Examination Report in Saudi Arabian Appln. No. 123441295, dated Jun. 6, 2024, 18 pages (with English Translation).

\* cited by examiner

NATURAL MATERIAL FOR SEPARATING OIL-IN-WATER EMULSIONS

TECHNICAL FIELD

The present disclosure is directed to separating emulsified oil from produced water.

BACKGROUND

The production of crude oil often produces entrained water, termed a water-cut. As reservoirs age, the water-cut increases. Generally, the entrained water is separated from the oil, and treated in a water oil separation plant (WOSP) to separate dispersed oily materials (emulsified oil) from the produced water, so that it may be injected into disposal wells or used for other applications. The basic design of the WOSP was intended to handle water-cuts less than 10%.

However, as an oil field matures, oil production decreases while water production increases. The current water/oil ratio is estimated at 2:1 to 3:1 worldwide, converting to a water cut of 50% to 75% of the total amount of produced fluids. A higher water-cut causes a significant reduction of separation efficiency, as the water requires more retention time in a WOSP for complete separation. An extreme volume of emulsified water can exceed the processing capacity of the WOSP, resulting in incomplete oil water separation. This leads to poor quality, or offspec, water being provided to injection wells.

SUMMARY

An embodiment described in examples herein provides a method for separating an oil-in-water emulsion in a water-oil separation plant (WOSP). The method includes feeding the oil-in-water emulsion to the WOSP, and forcing the oil-in-water emulsion through a silica sand filter to separate the oil and form a separated water stream.

Another embodiment described in examples herein provides a water-oil separation plant (WOSP). The WOSP includes a gravity separation vessel, an inlet for an oil-in-water emulsion, an oil outlet for separated oil, and a water outlet for separated water. The WOSP also includes a filter packed with silica sand disposed between the inlet and the water outlet, wherein the size of the silica sand is selected to separate oil from the oil-in-water emulsion.

DETAILED DESCRIPTION

A system and a method are provided herein for increasing the separation efficiency of a water oil separation plants (WOSP) with a filter that includes a silica filter media or pack. The silica filter pack provides a single step separation of emulsified crude oil. The filter improves the purity of the water produced from the WOSP.

Figure 1:
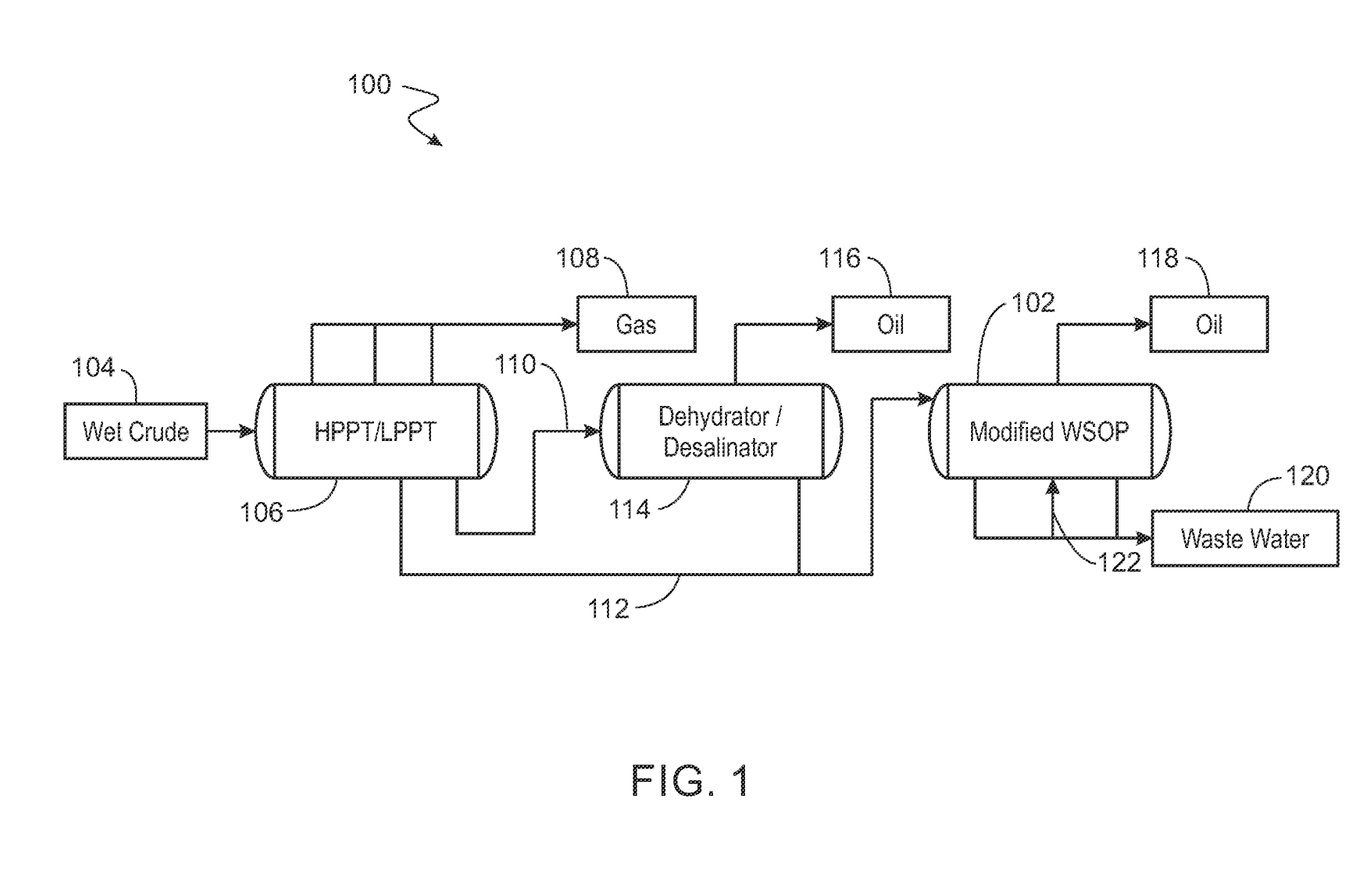
FIG. 1 is a schematic diagram of a gas oil separation process (GOSP) using a modified water oil separation plant (WOSP).

FIG. 1 is a schematic diagram of a gas oil separation process (GOSP) 100 using a modified WOSP 102. The GOSP 100 starts with the introduction of wet crude oil 104 into an high pressure product trap (HPPT)/low pressure production trap (LPPT) vessel 106. The HPPT/LPPT vessel 106 performs a separation of gas 108 from the wet crude oil 104, and produces two output streams, a crude oil stream 110, and an oil-in-water emulsion stream 112.

The crude oil stream 110 is provided to a dehydrator/desalinator 114 that removes salt and water from the crude oil stream 110, providing an oil 116 that is substantially dehydrated. The oil 116 is provided to other vessels and refinery for further processing. The dehydrator/desalinator 114 also produces an oil-in-water emulsion stream 112, which is combined with the oil-in-water emulsion stream 112 from the HPPT/LPPT vessel 106, and provided as a feed to the modified WOSP 102 described herein.

The modified WOSP 102 separates the oil-in-water emulsion, creating a oil 118 and a separated water 120 that can be provided to an injection well. As described herein, the modified WOSP 102 can use a filter to separate the oil from the oil-in-water emulsion. Over time, the filter may become clogged with debris. Accordingly, a backwash stream 122 may be taken from the separated water 120 clean the filter and any other units used for breaking the emulsion, such as a coalescer.

The oil-water separation process in a WOSP functions by gravity separation. The separation is controlled by a number of factors. The size of the oil droplets have a substantial influence significantly contribute the separation efficiency. The bigger the droplet size, faster the coalescence. In many cases, the oil droplet sizes vary between about 10 and about 100 μm. In the tests below, the mean size was about 50 μm. Further, the flow rates and residence time for water in WOSP vessel is importance to control the separation of crude oil.

Figure 2:
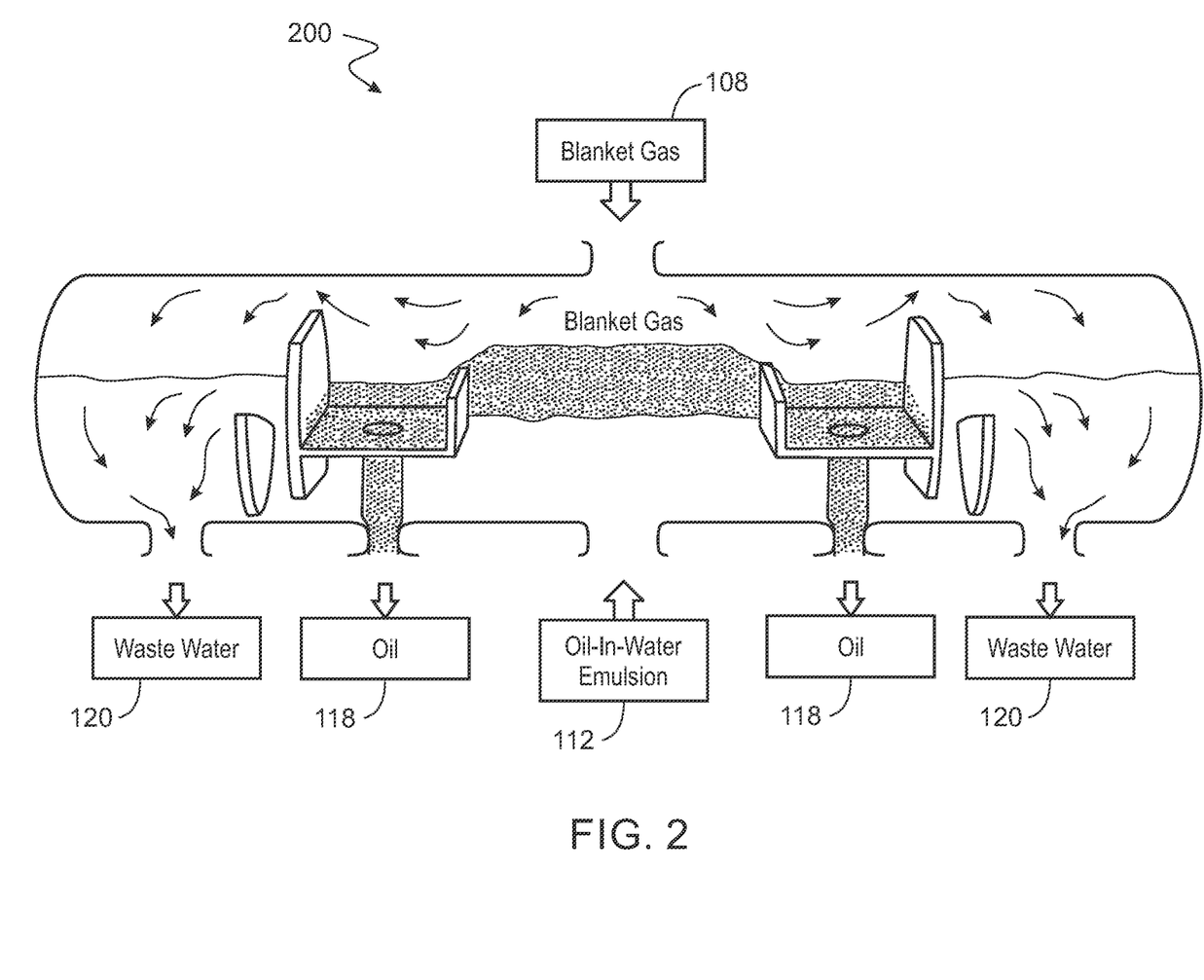
FIG. 2 is a schematic diagram of a typical WOSP that separates oil from oil-in-water emulsions by slowing flow rates and allowing for a settling time.

FIG. 2 is a schematic diagram of a current WOSP 200 that separates oil from an oil-in-water emulsion 202 by slowing flow rates providing for an increase in settling time. Like numbered items are as described with respect to FIG. 1. This allows dispersed crude in the oil-in-water emulsion 202 to flow to the top of the water, and solids impurities to sink to the bottom of the current WOSP 200. A blanket gas 204, for example, taken from the gas 108 from the HPPT/LPPT vessel is used to keep the current WOSP 200 oxygen free. As described herein, increasing water-cuts in the production of crude oil has significantly decreased the water removal efficiency of the current WOSP 200. The resulting impurities in the separated water 120 can cause injectivity problem at disposal wells.

Figure 3:
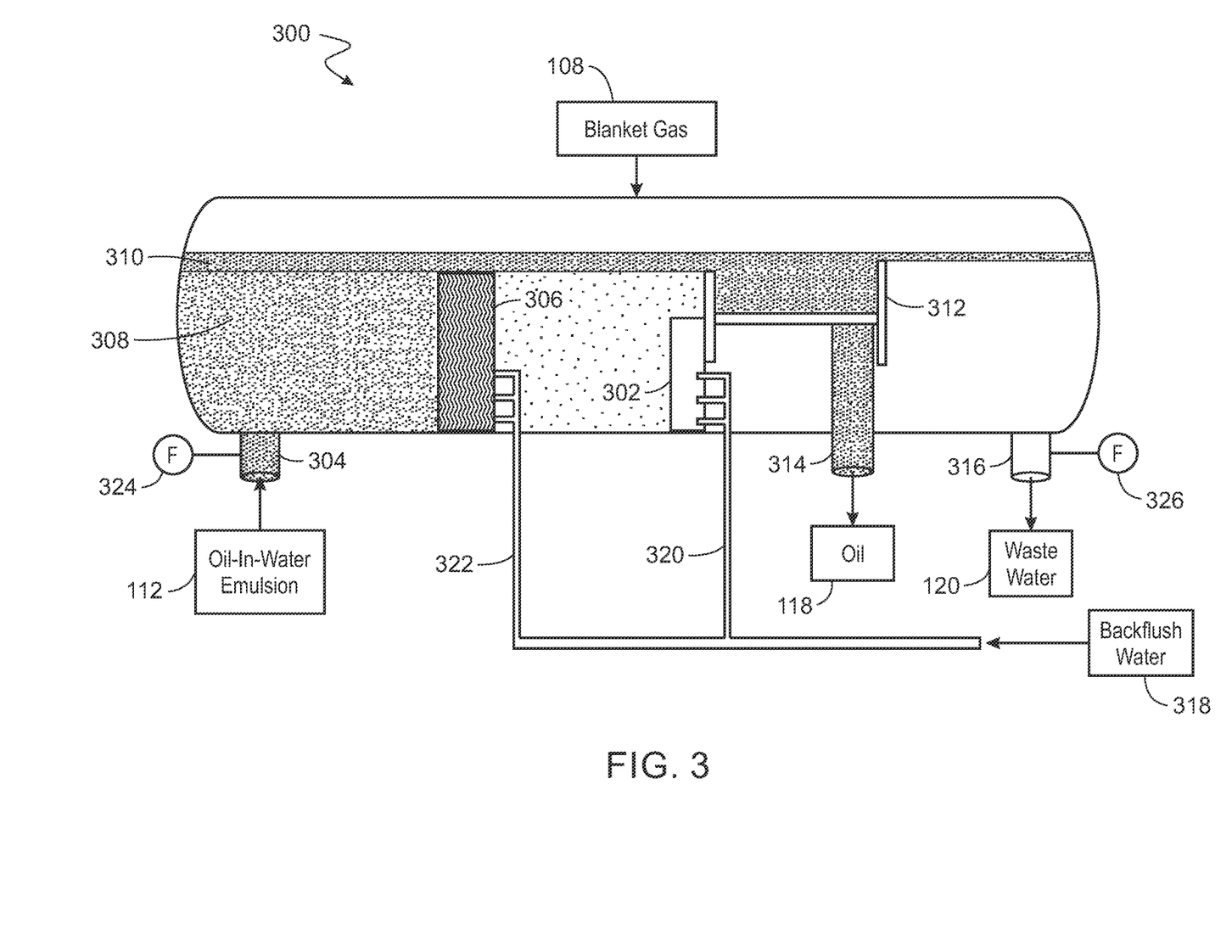
FIG. 3 is a modified WOSP that uses a filter that includes a silica sand packing to enhance the separation of oil from the oil-in-water emulsion.

FIG. 3 is a schematic drawing of a modified WOSP 300 that uses a filter 302 that includes a silica sand packing to enhance the separation of oil from the oil-in-water emulsion 202. Like numbered items are as described with respect to FIG. 1. Further, the modified WOSP 300 is one design that may be used as the modified WOSP 102 of FIG. 1. In other designs, multiple water outlets, oil outlets, or both, may be used.

The oil-in-water emulsion 202 is introduced into the modified WOSP 300 through an inlet line 304. In some embodiments, the oil-in-water emulsion 202 passes through a coalescer 306 that can be used to coalesce larger oil droplets. The coalescer 306 can include multiple textured plates that help to coalesce oil droplets as the oil-in-water emulsion 202 flows over the plates.

The coalesced oil droplets flow to the top of the water column 308, and the oil layer 310 is skimmed from the water column 308 by a weir 312. The oil 118 collected in the weir 312 exits the modified WOSP 300 through an oil outlet line 314. The water column 308 flows through the vessel and passes through the filter 302, which separates remaining oil droplets and solid impurities from the oil-in-water emulsion 202. The oil droplets may float to the top of the water column 308 and join the oil layer 310 or may be captured on the filter 302.

After passing through the filter 302, the separated water 120 exits the modified WOSP 300 through a water outlet line 316. Over time, the coalescer 306 and the filter 302 may become partially clogged with debris, lowering the efficacy of the modified WOSP 300. Accordingly, in some embodiments, backflush water 318 is injected through a line 320 coupled to the filter 302 and a line 322 coupled to the coalescer 306. The performance of the modified WOSP 300, such as liquid throughput, are measured in some embodiments to determine when to backwash the filter 302 and the coalescer 306. For example, a flow meter 324 on the inlet line 304 and a flow meter 326 on the water outlet line 316 may be used to determine the flow rate through the modified WOSP 300, and identify when the flow has decreased.

The filter 302 uses a silica-saturated material (quartz sand) as the filter media. The size of the quartz sand used for the filter media may be adjusted to improve the separation of oil, and other impurities, from the oil-in-water emulsion 112. As discussed above, the droplet size is an important factor in controlling the separation. The droplet size can be used to select the particle sizes of the filter media. The tests described herein used silica particle sizes between about 200 micron (μm) and about 500 micron (μm). For example, in some embodiments the quartz and has a mesh size of between about 10 (about 2000 μm) and about 200 (about 74 μm), or a mesh size of between about 20 (about 841 μm) and about 30 (about 595 μm). The use of the filter 302 improves the efficiency of the modified WOSP 300 separator, lowering the likelihood of injectivity issues at disposal wells.

Figure 4:
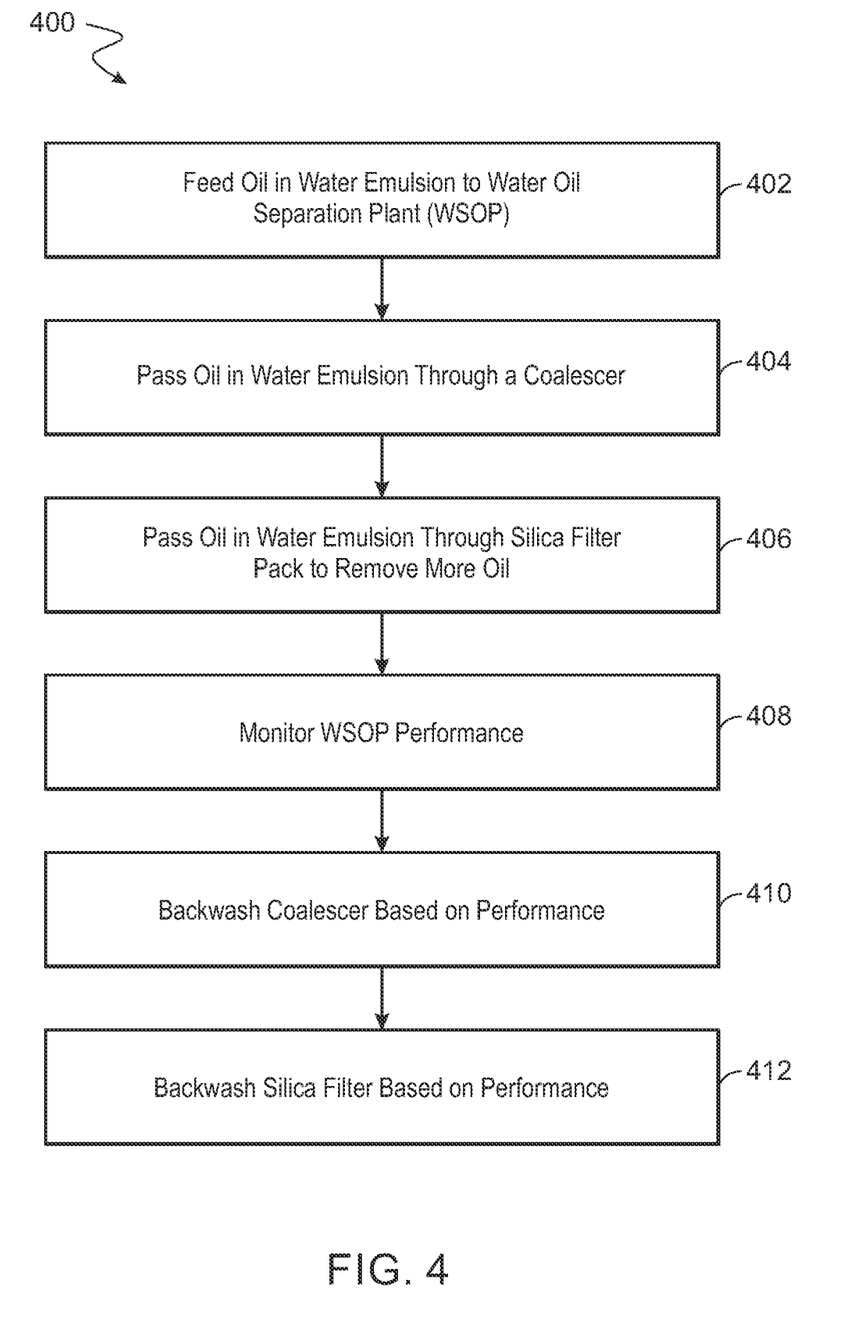
FIG. 4 is a process flow diagram of a method for separating oil from a water-in-oil emulsion using a filter that is packed with silica sand.

FIG. 4 is a process flow diagram of a method 400 for separating oil from a water-in-oil emulsion using a filter that is packed with silica sand. The method begins at block 402, when an oil-in-water emulsion is fed to a modified WOSP 300. At block 404, the oil-in-water emulsion is passed through a coalescer. In the coalescer, one or more textured plates assist in the coalescing of oil droplets, decreasing the total amount of oil in the oil-in-water emulsion.

At block 406, the oil-in-water emulsion is then passed through a silica sand pack in the filter to remove more, or all, of the remaining oil. This may be performed by coalescing oil droplets at the surface of the silica sand, or capturing oil droplets on the silica sand.

At block 408, the performance of the modified WOSP is monitored, for example, by tracking the flow rate of fluids through the modified WOSP. In some embodiments, this may be performed by a flowmeter on the inlet of the oil-in-water emulsion, a flowmeter on the outlet of the separated water, or both. In some embodiments, a level detector may be used to ensure that the modified WOSP is not overloaded as the coalescer and filter begin to plug.

At block 410, the coalescer may be backwash based on the performance of the modified WOSP. At block 412, the silica sand pack in the filter may be backwashed based on the performance of the modified WOSP.

EXAMPLES

Filtration

The performance of the filtration process was tested by collecting local silica samples, which were placed in a separating funnel. Water that was heavily contaminated with oil, forming oil in water emulsions, was transferred to the separating funnel and filtered through the media. The produced water was collected and tested for quality.

Filtering Procedure

The separatory funnel to hold the silica sand was placed in a stand. The funnel bottom was covered by a small cotton sponge to prevent the sand from flowing out. An emulsified mixture of 5% crude oil and 95% water was poured into the funnel. The funnel bottom valve was partially opened to allow the water to flow out.

Quality Testing Procedure

The water sample coming out from funnel was collected in a clean beaker and about 5 to 7 ml was transferred to a test tube. About 2 to 4 ml cyclohexane were added, and the test tube was shaken for 10 seconds. The crude from water was transferred to solvent. As the crude was dissolved in the solvent, the solvent changed to a yellow color. The intensity of the color was directly proportional to the amount of crude dissolved in solvent. The intensity of the color can be measured to measure the amount of oil present using a visible spectrometer.

A series of experiments were conducted on different particle size silica-based material on the filter media was found to be effective on removal of oily impurities in the produced water. As described herein, the filter media requires cleaning after a period of use, which may be done with utility water through a back-flushing process.

As described with respect to the following figures, the quality of the filtered water was substantially improved (>99.9%), and met all expected specifications for injection water. Specifically, the specification for disposal/injection water (produced water) indicates that oil content must be less-than 100-ppm. Preferably, the disposal water contains zero or a negligible amount of crude oil.

Injection water having crude oil in the range of about 100 ppm or greater will resist the water flow inside the formation rocks and cause an injectivity problem. Accordingly, removal of the crude from water will improve the water injection performance. Further, a single step filtration through the filter media was sufficient to produce high quality clean water.

Figure 5:
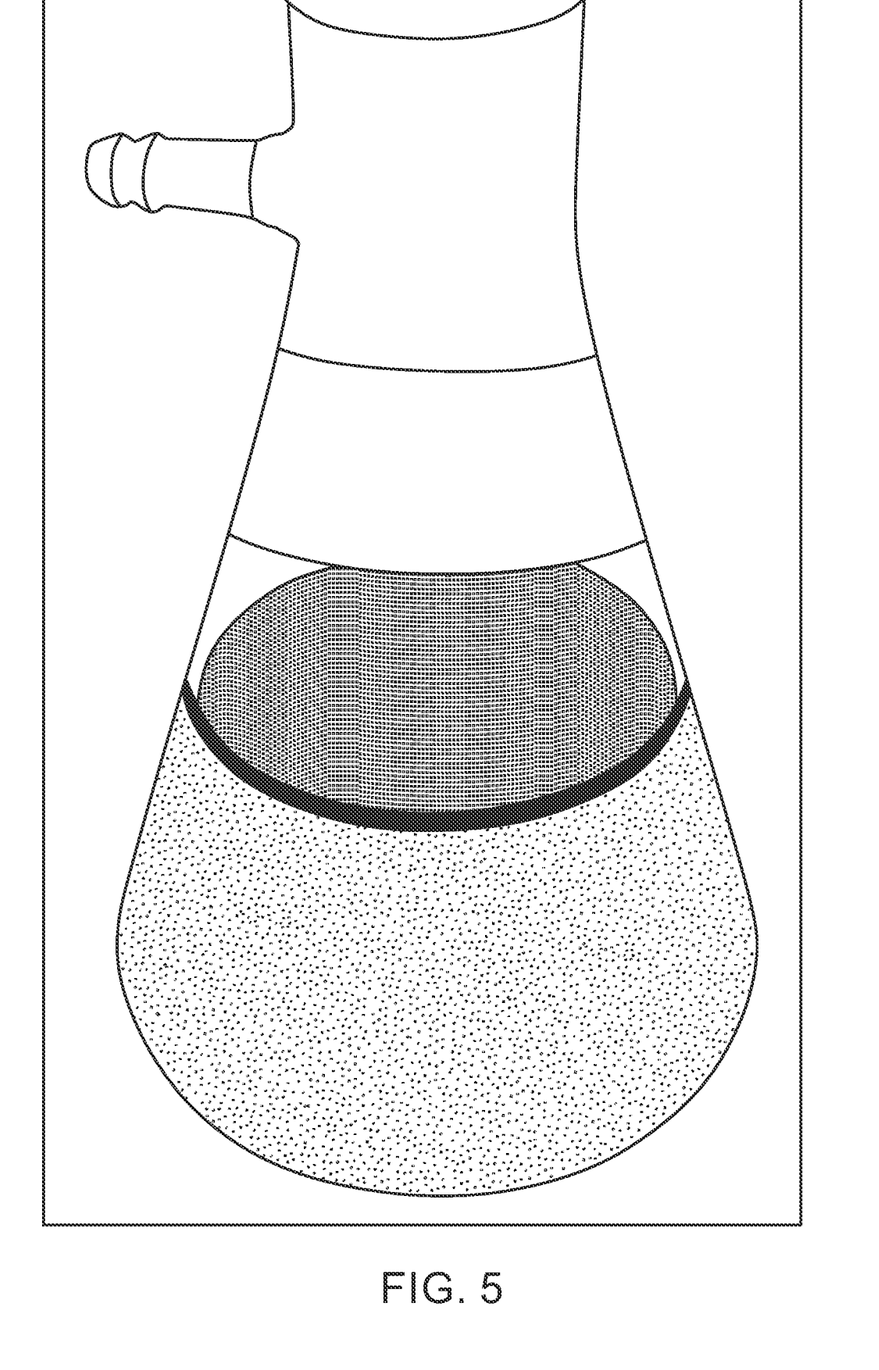
FIG. 5 is an illustration of an oil-in-water emulsion before filtration.

FIG. 5 is an illustration of an oil-in-water emulsion before filtration. In this example, a test sample of water with emulsified crude (5% crude ~50,000 ppm) was prepared in the lab and tested the filtration. The test sample was prepared using a high-speed blender. Oil and water samples were transferred to the blender and blended for 60 seconds at 4000 rpm. The emulsion sample was the filtered using the filtration system described above, for example, the separatory filled with silica sand.

Figure 6:
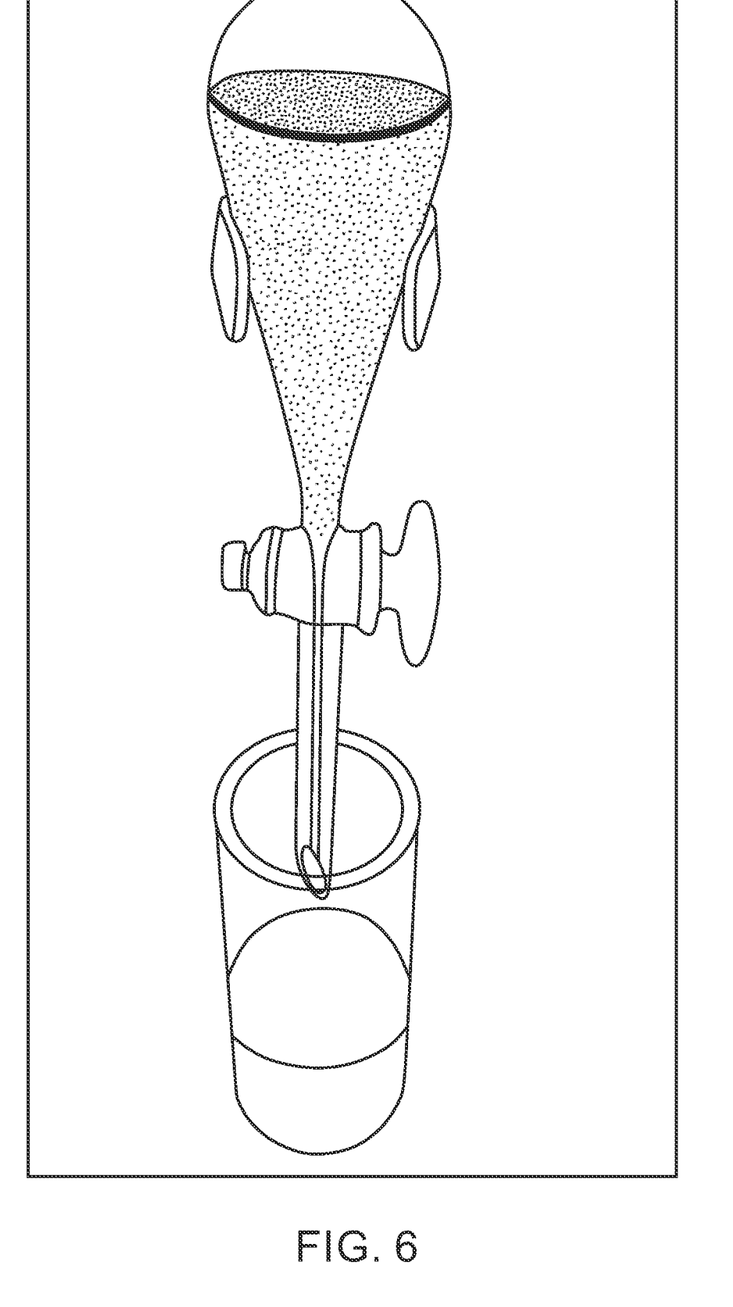
FIG. 6 is an illustration of the filtration process showing the purified water after filtration.

FIG. 6 is an illustration of the filtration process showing the purified water after filtration. The filtered water contains almost negligible concentration (<10 ppm) of crude in water.

Figure 7:
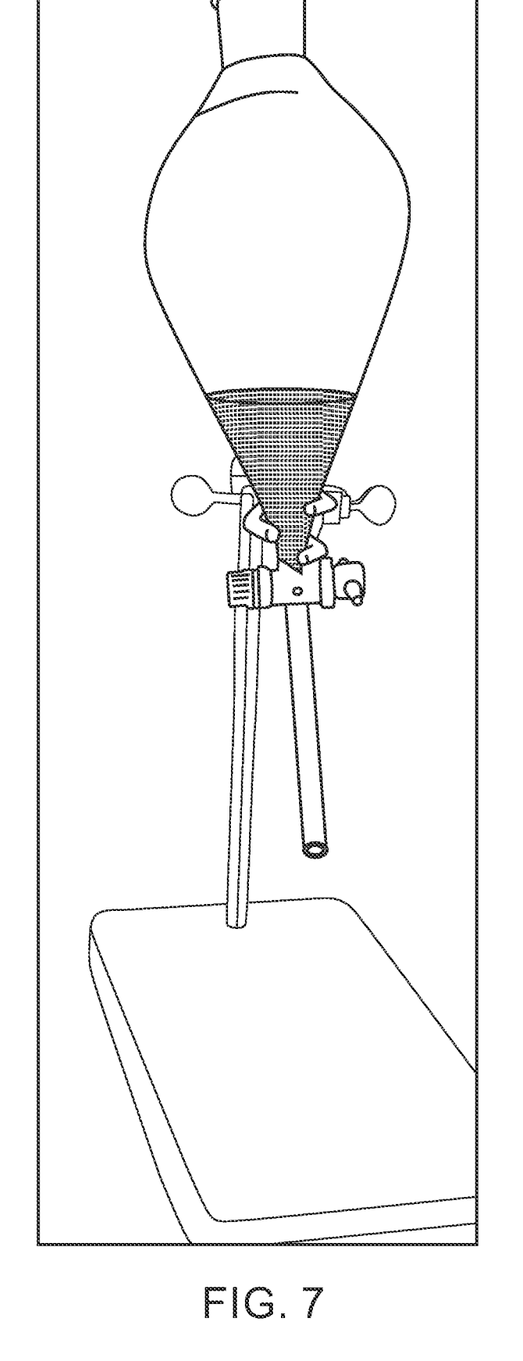
FIG. 7 is an illustration of a field sample of an oil-in-water emulsion.

FIG. 7 is an illustration of a field sample of an oil-in-water emulsion. The procedure was tested on field samples of disposal water that included emulsified oil. In this example, the separating funnel holds the emulsion.

Figure 8:
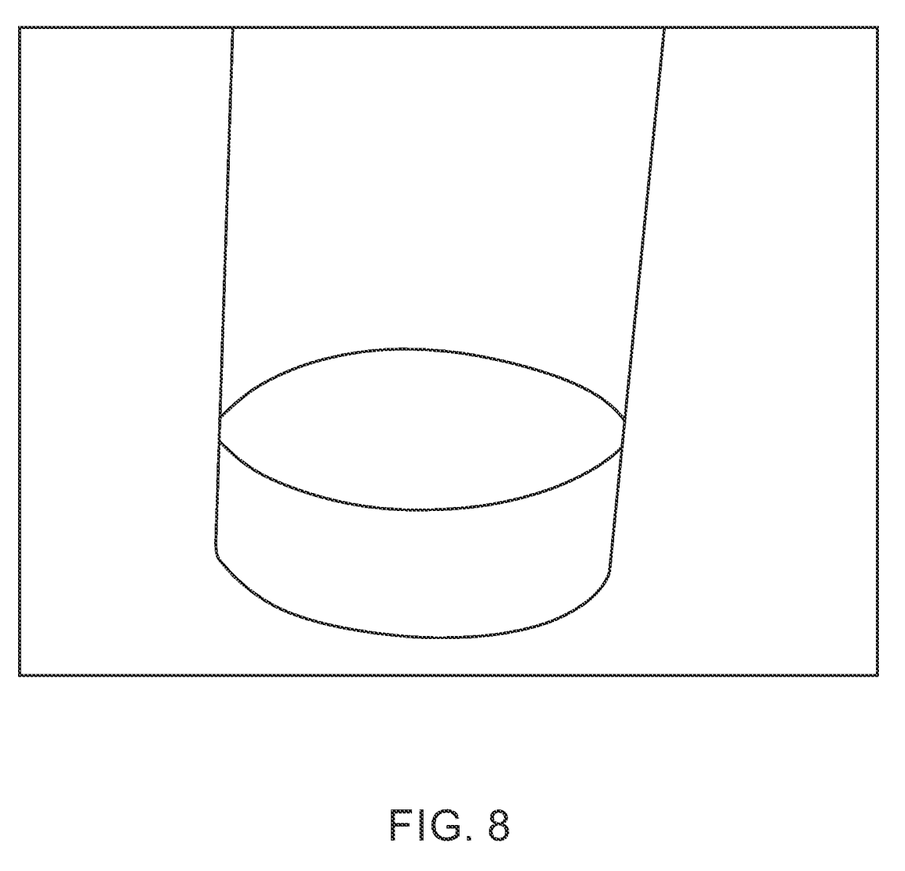
FIG. 8 is an illustration of water formed from the filtration process.

FIG. 8 is an illustration of water formed from the filtration process. As for the prepared test sample, the filtration of the field samples resulted in water that had a substantially reduced concentration of oil.

Figure 9A:
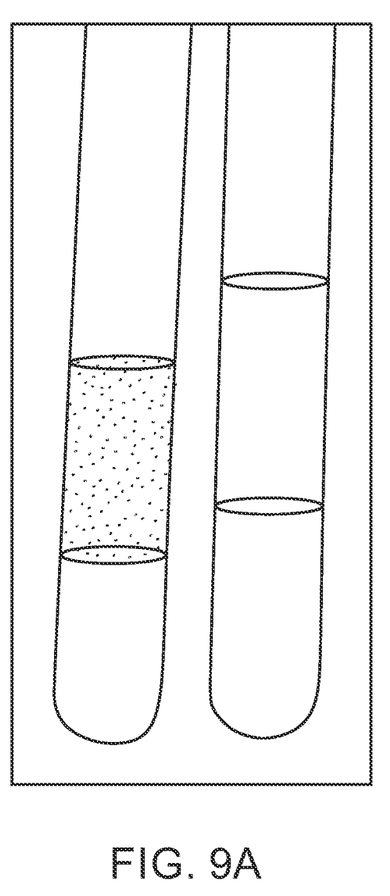
FIGS. 9A and 9B are illustrations of a comparison between existing treatment techniques, for example, of FIG. 2, to the filtration process, for example, of FIG. 3.
Figure 9B:
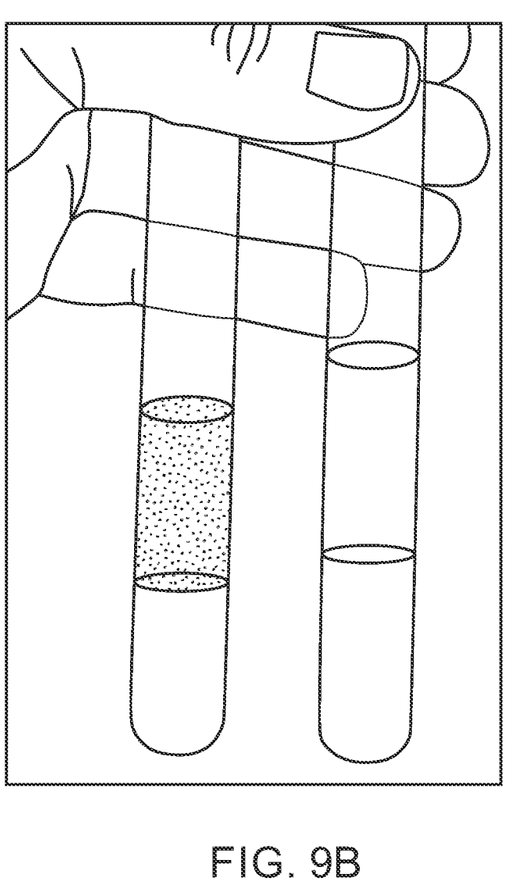

FIGS. 9A and 9B are illustrations of a comparison between existing treatment techniques and the filtration process, for example, of FIG. 3. The techniques can include a typical WOSP that uses gravity filtration for separation of the oil from the emulsion. Other techniques use solvent extraction. The illustration in FIG. 9A shows a comparison of the water from purification to a standard technique. As shown in FIG. 9A, the left-side tube has the water sample collected from a WOSP in the field after settling, e.g., gravity separation. This is the disposal water sample injected to the formation. The right-side tube water sample was laboratory prepared using the new filtration technique.

The comparison was repeated, with the results illustrated in FIG. 9B. As for FIG. 9A, the left-side tube has the water sample collected from a WOSP in the field after settling, e.g., gravity separation. This is the disposal water sample injected to the formation. The right-side tube water sample was laboratory prepared using the new filtration technique.

EMBODIMENTS

An embodiment described in examples herein provides a method for separating an oil-in-water emulsion in a water-oil separation plant (WOSP). The method includes feeding the oil-in-water emulsion to the WOSP, and forcing the oil-in-water emulsion through a silica sand filter to separate the oil and form a separated water stream.

In an aspect, the method includes monitoring a performance of the WOSP. In an aspect, monitoring the performance includes determining a throughput through the WOSP. In an aspect, monitoring the performance includes determining a level in the WOSP. In an aspect, the method includes backwashing the coalescer based, at least in part, on a performance of the WOSP.

In an aspect, the method includes passing the oil-in-water emulsion through a coalescer before the silica filter.

In an aspect, the method includes packing the silica filter with silica sand including a mesh size of between about 10 (about 2000 μm) and about 50 (about 297 μm). In an aspect, the method includes packing the silica filter with silica sand including a mesh size of between about 200 μm and about 500 μm.

In an aspect, the method includes recycling separated oil to an upstream dehydrator/desalinator.

In an aspect, the method includes injecting the separated water stream into a disposal well.

Another embodiment described in examples herein provides a water-oil separation plant (WOSP). The WOSP includes a gravity separation vessel, an inlet for an oil-in-water emulsion, an oil outlet for separated oil, and a water outlet for separated water. The WOSP also includes a filter packed with silica sand disposed between the inlet and the water outlet, wherein the size of the silica sand is selected to separate oil from the oil-in-water emulsion.

In an aspect, the WOSP includes a coalescer disposed between the inlet and the filter. In an aspect, the coalescer includes a coalescer plate including a surface texture to promote coalescence of oil droplets from the oil-in-water emulsion. In an aspect, the coalescer extends from the bottom of the gravity separation vessel to the top of the water column.

In an aspect, the WOSP includes an injection water line coupled to the filter for back flushing the filter. In an aspect, the WOSP includes an injection water line coupled to the coalescer for back flushing the coalescer.

In an aspect, the silica sand includes a mesh size of between about 10 (about 2000 μm) and about 200 (about 74 μm). In an aspect, the silica sand includes a mesh size of between about 200 μm and about 500 μm.

In an aspect, the WOSP includes an inlet flow meter on the inlet and an outlet flow meter on the water outlet, wherein measurements from the inlet flow meter and the outlet flow meter are used to determine performance of the WOSP.

In an aspect, the WOSP includes an oil detector on the water outlet to measure an amount of oil in the separated water Other implementations are also within the scope of the following claims.

What is claimed is:

1. A method for separating an oil-in-water emulsion in a water-oil separation plant (WOSP), comprising:
    feeding the oil-in-water emulsion to the WOSP; and
    forcing the oil-in-water emulsion through a silica sand filter to separate the oil and form a separated water stream, wherein the size of the silica sand is selected based, at least in part, on the size of the oil droplets in the oil-in-water emulsion, wherein the size of the silica sand is between 200 micrometers (μm) and 500 μm, and wherein the concentration of emulsified oil in water is reduced from about 5% to less than 0.1%.

2. The method of claim 1, comprising monitoring performance of the WOSP.

3. The method of claim 2, wherein monitoring the performance comprises determining a throughput through the WOSP.

4. The method of claim 2, wherein monitoring the performance comprises determining a level in the WOSP.

5. The method of claim 1, comprising passing the oil-in-water emulsion through a coalescer before the silica filter.

6. The method of claim 5, comprising backwashing the coalescer based, at least in part, on a performance of the WOSP.

7. The method of claim 1, comprising recycling separated oil to an upstream dehydrator/desalinator.

8. The method of claim 1, comprising injecting the separated water stream into a disposal well.

* * * * *